（12) United States Patent
Dew et al.

(10) Patent No.: US 9,219,343 B1
(45) Date of Patent: Dec. 22, 2015

(54) CRYSTAL CAPTURE HOUSING WITH NON-CONTACT FLUID COOLING

(71) Applicant: Gooch and Housego PLC, Ilminster, Somerset (GB)

(72) Inventors: Robert W. Dew, Lyndhurst, OH (US); Carl D. Brunetta, Mayfield, OH (US); Thomas E. Stenger, Bedford, OH (US); Gary C. Catella, Chagrin Falls, OH (US)

(73) Assignee: GOOCH AND HOUSEGO PLC, Ilminster, Somerset (GB)

( * ) Notice: Subject to any disclaimer, the term of this patent is extended or adjusted under 35 U.S.C. 154(b) by 0 days.

(21) Appl. No.: 14/742,341

(22) Filed: Jun. 17, 2015

Related U.S. Application Data

(60) Provisional application No. 62/067,169, filed on Oct. 22, 2014.

(51) Int. Cl.
*H01S 3/113* (2006.01)
*H01S 3/04* (2006.01)
*H04B 10/50* (2013.01)
*G02F 1/01* (2006.01)
*H01S 3/115* (2006.01)
*H01S 3/042* (2006.01)
*H01S 3/02* (2006.01)
*H01S 3/11* (2006.01)

(52) U.S. Cl.
CPC ............ *H01S 3/0401* (2013.01); *G02F 1/0136* (2013.01); *H01S 3/02* (2013.01); *H01S 3/025* (2013.01); *H01S 3/04* (2013.01); *H01S 3/042* (2013.01); *H01S 3/0407* (2013.01); *H01S 3/11* (2013.01); *H01S 3/115* (2013.01); *H04B 10/501* (2013.01)

(58) Field of Classification Search
CPC ......... H01S 3/0407; H01S 3/042; H01S 3/04; H01S 3/025; H01S 3/02; H01S 3/115; H01S 3/11
USPC .......................................... 372/12, 10, 34, 35
See application file for complete search history.

(56) References Cited

U.S. PATENT DOCUMENTS

| 5,359,616 | A | * | 10/1994 | Yasui | ................... | B23K 26/063 372/39 |
| 7,508,850 | B2 | * | 3/2009 | Newman | ............... | B23K 26/063 372/12 |
| 2011/0134947 | A1 | * | 6/2011 | Rahum | ............... | H01S 3/09415 372/29.015 |

* cited by examiner

*Primary Examiner* — Kinam Park
(74) *Attorney, Agent, or Firm* — Jetter & Associates, P.A.

(57) ABSTRACT

A crystal capture housing (housing) for cooling an optical device including a crystal having optical end faces and non-optical faces spanning a length between the optical end faces. An outer housing body (body) has end openings and a crystal mount assembly (CMA) includes a thermally conductive material having end openings connected to an internal opening sized to mount the crystal therein. The CMA thermally contacts each of the non-optical faces of said crystal. The CMA includes a plurality of embedded liquid coolant conduit channels (coolant channels) formed therethrough spanning the length, and the CMA is sized to fit within the body and provide an air gap between the CMA and the body.

19 Claims, 4 Drawing Sheets

CRYSTAL CAPTURE HOUSING WITH NON-CONTACT FLUID COOLING

CROSS REFERENCE TO RELATED APPLICATIONS

This application claims the benefit of Provisional Application Ser. No. 62/067,169 entitled "CRYSTAL CAPTURE HOUSING WITH NON-CONTACT FLUID COOLING", filed on Oct. 22, 2014, which is herein incorporated by reference in its entirety.

FIELD

Disclosed embodiments relate to crystal capture housings for the cooling of crystals in optical devices.

BACKGROUND

Pockels cells are one type of electro-optic (EO) device used to alter the polarization state of optical radiation. Pockels cells operate on a principle known as the Pockels or linear electro-optic effect, where an applied electric field produces linear changes in the refractive index of an optical material. This change in refractive index can be used to alter the phase of incoming light. The phase change can be used directly, or to alter the polarization state of incident light beams, with applications such as for Q-switching a laser.

Because their switching behaviour largely depends on the drive electronics which can deliver fast signals, Pockels cells generally provide a faster response time as compared to acousto-optic (AO) or liquid crystal based Q-switch devices. Non-linear optical (NLO) crystals are an example of a passive optical device that uses a related effect where the dielectric polarization responds nonlinearly to the electric E field of the light typically observed at high light intensities so that the values of the E field are comparable to interatomic electric fields in the NLO, typically $10^8$ V/m such as those provided by lasers, allowing for frequency conversion (e.g., frequency doubling) by the NLO of an input laser pulse. In addition of these examples many other optical components would benefit from this advancement.

One of the most prevalent field failure modes for high-repetition rate and high-power optical devices, such as EO and NLO devices, is the degradation of the properties of the crystalline material due to thermal effects. The heat generated in the crystal from the applied electrical current and/or the absorption of laser light within the crystalline media or on the electrode facet due to a misaligned beam, can cause degraded optical device performance through thermal lensing, depolarization, and/or degradation of the electrical properties, while sometimes ultimately leading to the physical destruction of the crystalline material resulting from a significant reduction of the power handling capability.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include crystal capture housings featuring non-contact fluid cooling and environmentally protecting features for optical devices which recognize physically contacting the optical material (crystal) in order to hold it in an oriented mount or to affix a temperature control apparatus that imparts strain to the crystal which can further degrade the performance of the optical device. Moreover, flowing a liquid or a gaseous coolant in direct physical contact with the crystal is difficult to implement because the coolant media cannot generally contact the polished optical faces of the device due to the risk of contamination, degradation of the polished surfaces, and/or an alteration of the optical beam path due to a difference in refractive indices. These considerations conventionally necessitate a liquid-tight (gas-tight) seal around the optical surface of the crystal which applies added strain to the crystal. This technique also makes the design and construction of the electrode assembly for electro optic (EO) devices more difficult.

Known physical heat sinks are a more widely used alternative for cooling optical devices, however it is recognized that such heat sinks physically contact two of the non-optical faces of the crystal which imparts strain. Furthermore, this technique only removes heat from the optical device from two facets of the crystal which, in the case of crystalline materials with low thermal conductivity, may not be enough heat dispersion to adequately increase the power handling or the lifetime of the optical device. In addition, although the use of apertures can help to protect the internal faces of the crystal, beam "clipping" of the edges of the aperture can cause the surface of the aperture to heat up significantly which in turn can heat the crystal radioactively.

Example embodiments include a crystal capture housing (housing) featuring non-contact fluid-based cooling for cooling and environmentally protecting optical devices including a crystal having optical end faces and non-optical faces spanning a length between the optical end faces. The housing includes an outer housing body (body) having end openings, a crystal mount assembly (CMA) comprising a thermally conductive material having end openings connected to an internal opening sized to mount the crystal, wherein the CMA thermally contacts each of the non-optical faces of the crystal, and can fully surround each non-optical face of the crystal. The CMA includes a plurality of embedded liquid coolant conduit channels (coolant channels) formed there through spanning the length. The CMA is sized to be small enough to fit within the body and provide an air gap between the CMA and the body, where the air gap can be used to provide gas cooling for the optical device in addition to the liquid cooling provided by the coolant channels.

BRIEF DESCRIPTION OF THE DRAWINGS

Reference will now be made to the accompanying drawings, which are not necessarily drawn to scale, wherein.

DETAILED DESCRIPTION

Figure 1A:
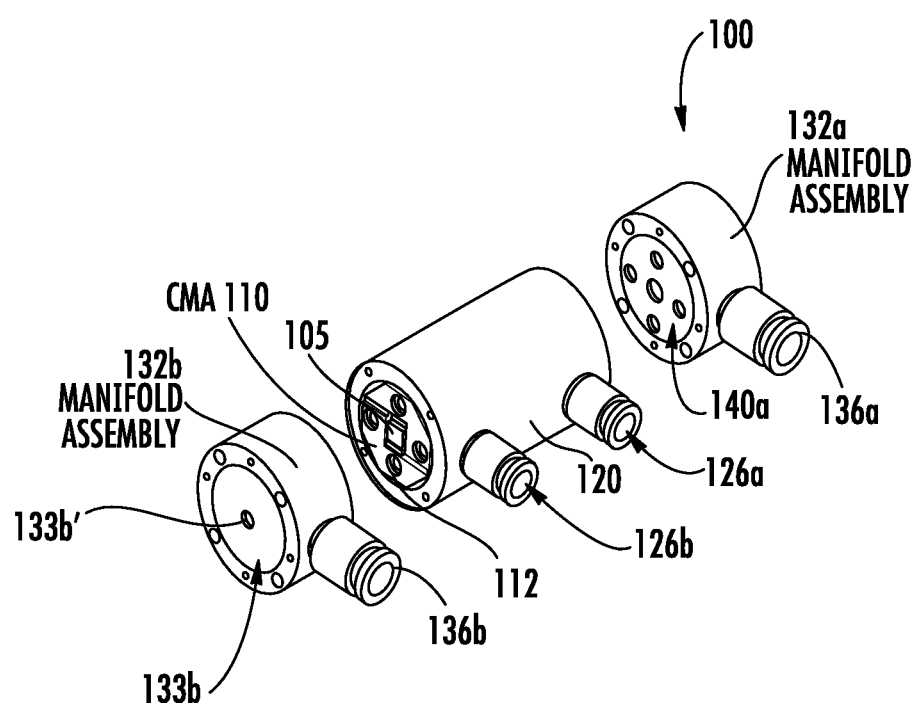
FIG. 1A is a partially exploded depiction of an example housing that provides non-contact fluid cooling and other environmental control for an EO device mounted therein, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Figure 1B:
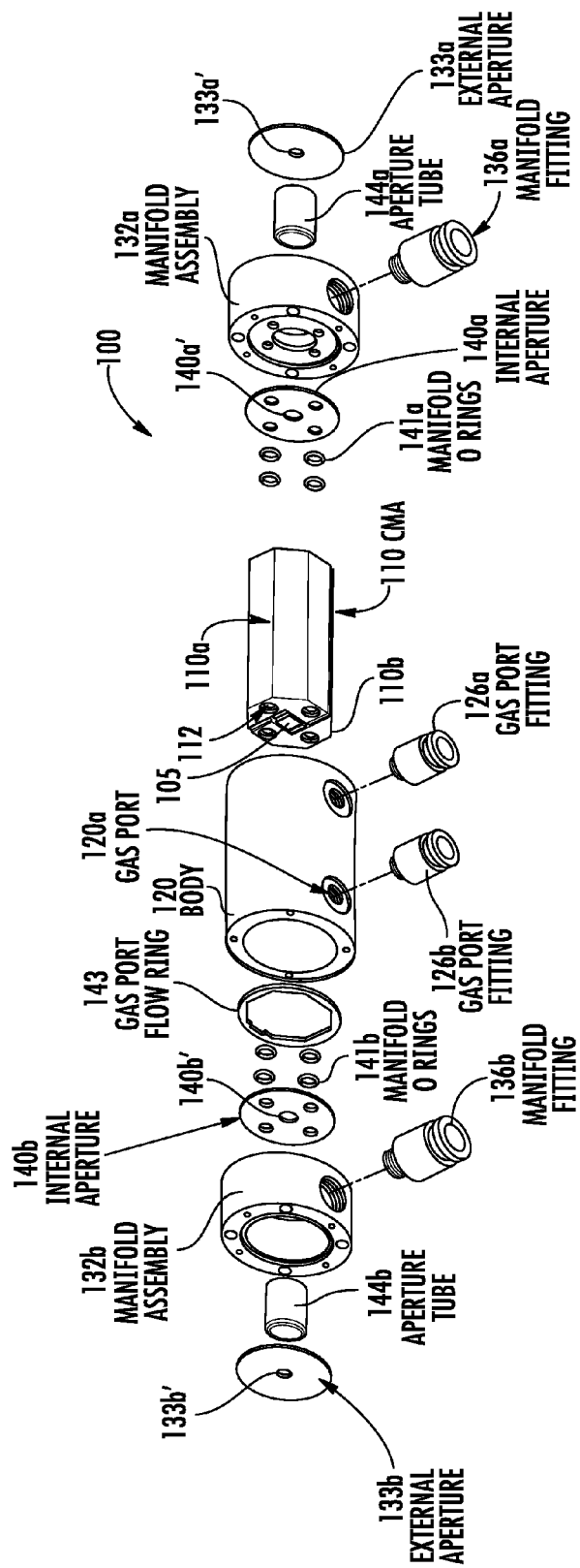
FIG. 1B is exploded view depiction of the housing shown in FIG. 1A, according to an example embodiment.
Figure 1C:
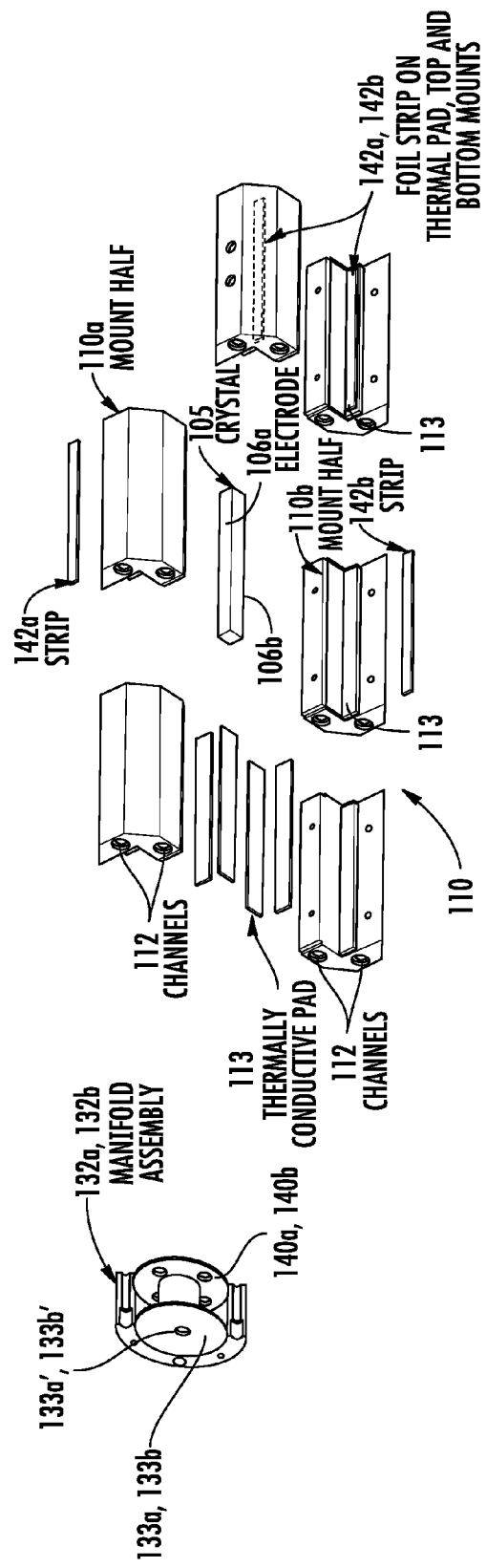
FIG. 1C is a piecewise fully exploded depiction of the CMA shown in FIGS. 1A and 1B and a cutaway view of a manifold assembly shown in FIG. 1B, according to an example embodiment.

FIG. 1A is a partially exploded depiction of an example housing 100 that provides non-contact fluid cooling and other environmental control for an optical device described as being an EO device mounted therein. FIG. 1B is exploded view depiction of the housing 100 shown in FIG. 1A, according to an example embodiment. FIG. 1C is a piecewise fully exploded depiction of the CMA shown in FIGS. 1A and 1B and a cutaway view of a manifold assembly 132a, 132b shown in FIG. 1B, according to an example embodiment.

Housing 100 is shown including a CMA 110 having a crystal 105 of an EO device secured therein that fully surrounds each non-optical face of the crystal 105, where the CMA 110 is within an outer housing body (body) 120 that has end openings. Body 120 has side openings 120a (see FIG. 1B labeled as a "gas port") along its length dimension for receiving the gas port fittings 126a and 126b shown in FIG. 1B. Each of the ends of the body 120/CMA 110 is capped by an aperture manifold referred to herein as a first manifold assembly 132a and a second manifold assembly 132b, which can comprise a ceramic or a metal. The first manifold assembly 132a includes a port receiving a first manifold fitting 136a and the second manifold assembly 132b includes a port receiving a second manifold fitting 136b.

CMA 110 also has a plurality of embedded liquid coolant conduit channels (coolant channels) 112 bored or otherwise formed there through along a length dimension of the housing 100 extending from one end to the other, with one coolant channel 112 shown as an example provided for each of the four non-optical faces of the crystal 105. The first manifold assembly 132a and second manifold assembly 132b are fluidically coupled to the coolant channels 112 for enabling a pumped coolant liquid to flow through the coolant channels 112 to remove heat from the non-optical faces of the crystal 105 during operation of the optical device. For example, the cooling liquid can be supplied from running tap water or from a closed loop cooling system.

The external aperture 133b shown in FIGS. 1A and 1B and external aperture 133a shown in FIG. 1B each have a passage 133b' and 133a' for passing the optical beam. An internal aperture 140a is shown in FIGS. 1A and 1B, where FIG. 1B also shows internal aperture 140b, which have holes aligned with the embedded coolant channels 112 and a center hole 140a', 140b' for passing the optical beam. Although housing 100 is shown being cylindrically shaped, disclosed housing may take on a variety of other shapes.

The CMA 110 is shown implementing a "clamshell" crystal capture approach by including a first shell 110a and the second shell 110b as shown in FIGS. 1B and 1n FIG. 1C (each as a "mount half"). However, it is possible for the CMA 110 to be a single unitary piece or any other number of shells (e.g., 3 or 4). The optical device embodied as an EO device can comprise a Pockels cell, EO modulator, EO deflector, or an acousto-optic frequency-shifter (AOFS). Although the optical device is generally described herein as being an EO device, disclosed crystal capture housings with non-contact fluid cooling can also be applied to cool and protect other optical devices such as non-linear optical (NLO) devices, magneto-optical (MO) devices, and long path-length prisms (Wollaston or Rhombs).

The first shell 110a and second shell 110b each generally comprise a thermally conductive material, such as a thermally conductive plastic or thermally conductive ceramic material. As used herein, a thermally conductive material refers to a material having a 20° C. thermal conductivity>10 W/m·K. CMA 110 has end openings corresponding to the optical faces of the crystal 105 of the EO device. In FIG. 1C a top electrode 106a is shown on the top face of the crystal 105 and there is a bottom electrode 106b shown on the bottom face of the crystal 105. For the EO device shown in FIGS. 1A-C, the material for the CMA 110 should also be non-electrically conductive (a dielectric) to maintain electrical isolation from the electrodes 106a and 106b. For applications for NLO devices or other passive optics the material for CMA 110 can be a thermally and electrically conductive material, such as a metal, metal alloy, or comprise most other electrically conductive materials.

The crystal 105 is generally mounted within the CMA 110 using a thermally conductive non-electrically conductive elastomer on all four non-optical faces of the crystal 105. The elastomeric material does not harden or cure, and thus remains pliable to relieve strain on the crystal 105. The term "elastomer" as used herein includes any adhesive, putty, or compound that has the property of not hardening or curing.

There are also thermally and electrically conductive strips 142a and 142b (e.g., copper strips) in physical contact with the surface of the electrodes 106a and 106b of the optical device. These electrically conductive strips 142a and 142b are generally held in place generally by a thermally conductive elastomer and the compressive force of the first shell 110a and second shell 110b of the CMA 110. The thermally conductive elastomer insures that the non-optical faces of the crystal 105 are all in good thermal contact with the thermally conductive material of the first and second shells 110a and 110b. As shown in FIG. 1C, there are also thermally conductive mounting pads 113 exterior to the electrically conductive strips 142a and 142b.

Although not shown in FIGS. 1A-C, housing 100 includes an electrical contact arrangement to enable an external bias source to provide bias to the electrodes 106a and 106b of the EO device. One example electrical contact arrangement involves adding through-hole apertures in the CMA 110 and in the body 120 over each of the electrically conductive strips 142a and 142b, where the apertures are then filled with a flowable electrically conductive material to provide good electric contact to each of the electrically conductive strips 142a and 142b through the apertures. As the CMA 110 and body 120 can be thermally conductive, but not electrically conductive, the filled apertures will not short to one another. One example flowable electrically conductive material is an epoxy filled with metal particles, such as a silver conductive epoxy, which can provide about a 0.02 Ω·cm 25° C. electrical resistivity and 0.90 W/(m·K) thermal conductivity, adherence to most substrates, and curing in less than 15 minutes, during which wired connections to the can be made to the filled epoxy. Another example electrical contact arrangement comprises the electrically conductive strips 142a and 142b having an end tab that extends into a grove in the CMA 110, where a wired connection can be made to the tab portion of strip within the grove of the CMA 110. For passive optics, as no electrical contact arrangement is used, there are generally no filled apertures or metal tabs.

During assembly the CMA 110 having the crystal 105 secured therein is placed within the body 120 that has end openings. Body 120 has optional side openings 120a along its length dimension for receiving gas port fittings 126a and 126b. As disclosed above, the inside opening provided by the body 120 is sized larger relative to the CMA 110 so that there is an air channel space (air gap) between the outside surface of CMA 110 and the inside surface of the body 120 to allow a clean, dry gas introduced via gas port fittings 126a and 126b to be flowed across one optical face of the crystal 105, along the internal surface of the body 120, and out across the adjacent (other) optical face of the crystal 105. The gas cooling facilitates the reduction of heat directly from the generally anti-reflective (AR) coated polished optical faces of the crystal 105. The air gap also protects the optical faces of the crystal 105 from contact with the manifold assemblies 132a and 132b and therefore possible physical damage. Furthermore, the air gap prevents electrical discharge (arching) from the electrodes 106a and 106b on the crystal 105 when the optical device comprises an EO device to surrounding electrically conductive (e.g., metal) surfaces.

As disclosed above, the internal apertures 140a and 140b shown in FIG. 1B have holes aligned with the coolant channels 112 and a center hole 140a', 140b' for passing the optical beam, and manifold O-rings 141a and 141b framing the coolant channels 112 shown in between. As disclosed above, the manifold assemblies 132a and 132b allow the liquid coolant to flow through the coolant channels 112 to remove remove/reduce thermal energy caused by the stripped laser (or other light source) radiation at the internal apertures 140a and 140b. There is a gas port flow ring 143 shown in FIG. 1B between the body 120 and each of the internal apertures 140a and 140b.

The manifold assemblies 132a and 132b also include an external aperture 133a and 133b, respectively. The internal apertures 140a and 140b are bonded to the external apertures 133a and 133b via the aperture tubes 144a and 144b, respectively. The aperture tubes 144a and 144b provide a boundary for the optical path of the operational laser light while providing a liquid tight cavity between the internal apertures 140a and 140b and external apertures 133a and 133b with the housing of the manifold assemblies 132a, 132b. The aperture tubes 144a and 144b shown in FIG. 1B function as a physical boundary providing spacing between the internal apertures (140a, 140b) and external apertures (133a and 133b) which would also generally be needed in the absence of liquid cooling.

In operation of an optical device such as an EO device within the housing 100, the liquid coolant flow starts in one of the coolant channels 112 at one of the manifold assemblies such as manifold assembly 132a by coolant fluid pumped through its associated first manifold fitting 136a where it cools the external aperture 133a and internal aperture 140a, and this single flow is split into four essentially equally pressurized channels that flow the liquid through the coolant channels 112 formed in the CMA 110 for removing heat radiating out from the crystal 105. The four coolant channels 112 converge within the other aperture of the manifold assembly 132b where further heat is removed from the internal aperture 140b and external aperture 133b as the fluid exits the housed EO device via second manifold fitting 136b. The second manifold fitting 136b can either couple to a drain to dispense the liquid or be coupled to feed the liquid back into a closed loop cooling system that typically includes at least one heat exchanger.

The shell design of the CMA 110 also accommodates the use of highly thermally conductive ceramics for the body 120 as an alternative to a thermally conductive plastic material if a further increase of thermal conductivity is desired. Body 120 may comprise a metal for a passive optic (non-EO) device application. The coolant channels 112 can also be further structurally reinforced through the addition of a metal (e.g., stainless steel) lining if further rigidity is desired.

It is noted that although the gas cooling feature described above featuring gas port fittings 126a and 126b removes heat directly from the generally AR coated optical surfaces of the EO crystal 105, it does carry the risk of contaminating the inner optical surfaces of the EO device if the gas purity is not adequate. For this reason the overall design of the housing 100 can be modified so that a customer can select whether or not to include the gas cooling feature with access provided by gas port fittings 126a and 126b. In the event that gas cooling is not needed for a given application, gas port fittings 126a, 126b and gas port flow ring 143 need not be included. All apertures and spacings can stay otherwise unchanged.

Figure 2:
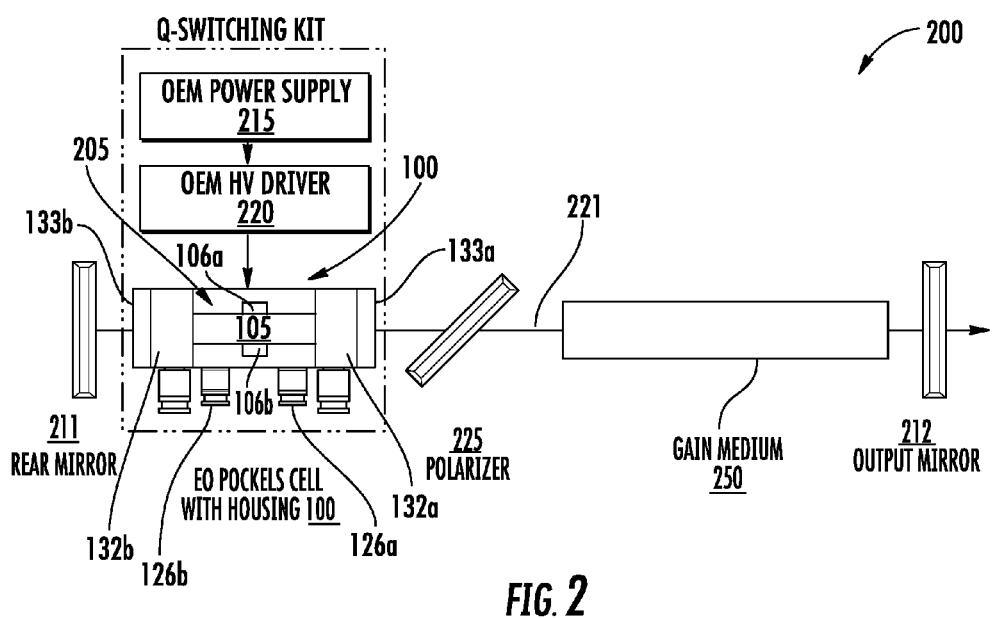
FIG. 2 depicts a Q-switched laser system including an EO pockels cell mounted within a disclosed housing that provides non-contact fluid cooling and other environmental control for the EO pockels cell.

FIG. 2 depicts a Q-switched laser system 200 including an EO pockels cell 205 within a disclosed housing 100 within a laser cavity defined by highly reflective (HR) rear mirror 211 and partially reflective output mirror 212 having a polarizer 225 and a solid-state gain medium 250 shown in the laser cavity. The laser beam is shown as 221. The housing 100 provides non-contact liquid and gas cooling and environmental control as described above for the EO pockels cell 205. The EO pockels cell 205 has electrodes 106a, 106b on its crystal 105 that are driven by the HV driver 220 coupled to the power supply 215 shown to provide a Q-switching kit for the laser system 200.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example, as described above, disclosed housings can be used for cooling or heating optical devices other than EO devices, such as NLO devices or other passive optics. Moreover, disclosed housings can be used with electronic devices such as power semiconductor devices.

EXAMPLES

Disclosed embodiments are further illustrated by the following specific Examples, which should not be construed as limiting the scope or content of this Disclosure in any way.

An actively cooled version of a 4 mm aperture EO pockels cell can be constructed using an above-described crystal capture housing with non-contact fluid cooling having apertures filled with metal epoxy or metal tabs to allow electrical contact to the electrodes. The EO pockels cell can include cadmium telluride (CdTe) crystal 105 of nominal dimension 5×5×50 mm held within a CMA 110 with a diameter of approximately 30 mm and a length of approximately 52 mm. The CMA 110 can be constructed from a boron nitride (BN) loaded elastomer (a thermally conductive composite material) which utilizes thermally conductive mounting pads 113 also made from a BN loaded elastomer.

The CMA 110 can be secured within the body 120, where the body 120 can be constructed from a thermally insulating material with an approximate outer diameter of 34 mm and a length of 54 mm. Manifold assemblies 132a and 132b comprising a thermally insulated material can be affixed to the two ends of the body 120. Manifold fittings 136a and 136b accept a flexible hose for the supply and removal of liquid coolant, while gas port fittings 126a and 126b can accept a flexible hose for the supply and removal of a gaseous coolant.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A crystal capture housing (housing) for cooling an optical device including a crystal having optical end faces and non-optical faces spanning a length between said optical end faces, comprising:
   an outer housing body (body) having end openings;
   a crystal mount assembly (CMA) comprising a thermally conductive material having end openings connected to an internal opening sized to mount said crystal therein, said CMA thermally contacting each of said non-optical faces of said crystal;
   wherein said CMA includes a plurality of embedded liquid coolant conduit channels (coolant channels) formed therethrough spanning said length, and
   wherein said CMA is sized to fit within said body and provide an air gap between said CMA and said body.

2. The housing of claim 1, further comprising a first manifold assembly including a first manifold fitting on one end of said body and a second manifold assembly including a second manifold fitting on another end of said body fluidically coupled to said coolant channels for allowing a pumped coolant liquid to flow through said coolant channels to remove heat from said non-optical faces of said crystal during operation of said optical device.

3. The housing of claim 1, wherein said non-optical faces include four non-optical faces including first and second electrodes further comprising electrically conductive strips contacting said electrodes and a thermally conductive material between each of said four non-optical faces and said CMA.

4. The housing of claim 2, wherein said end openings of said CMA and said body are capped by said first and said second manifold assembly that said coolant channels attach to.

5. The housing of claim 1, wherein said optical device further comprises first and second electrodes on first and second ones of said non-optical faces, and wherein said CMA comprises a non-electrically conductive (dielectric) material.

6. The housing of claim 1, wherein said CMA fully surrounds each of said non-optical faces of said crystal.

7. An optical system, comprising:
   an optical device including a crystal having optical end faces and non-optical faces spanning a length between said optical end faces;
   a crystal capture housing (housing) for cooling said optical device, comprising:
      an outer housing body (body) having end openings;
      a crystal mount assembly (CMA) comprising a thermally conductive material having end openings connected to an internal opening sized to mount said crystal therein, said CMA thermally contacting each of said non-optical faces of said crystal;
      wherein said CMA includes a plurality of embedded liquid coolant conduit channels (coolant channels) formed therethrough spanning said length, and
      wherein said CMA is sized to fit within said body and provide an air gap between said CMA and said body.

8. The optical system of claim 7, wherein said housing further comprises a first manifold assembly including a first manifold fitting on one end of said body and a second manifold assembly including a second manifold fitting on another end of said body fluidically coupled to said coolant channels for allowing a pumped coolant liquid to flow through said coolant channels to remove heat from said non-optical faces of said crystal during operation of said optical device.

9. The optical system of claim 7, wherein said non-optical faces include four non-optical faces including first and second electrodes, wherein said housing further comprises electrically conductive strips contacting said electrodes and a thermally conductive material between each of said four non-optical faces and said CMA.

10. The optical system of claim 8, wherein said end openings of said CMA and said body are capped by said first and said second manifold assembly that said coolant channels attach to.

11. The optical system of claim 7, wherein said optical device further comprises first and second electrodes on first and second ones of said non-optical faces, and wherein said CMA comprises a non-electrically conductive (dielectric) material.

12. The optical system of claim 7, wherein said CMA fully surrounds each of said non-optical faces of said crystal.

13. The optical system of claim 7, wherein said optical device comprises an electro optic (EO) pockels cell comprising first and second electrodes on first and second ones of said non-optical faces, and wherein said system comprises a Q-switched laser system including a laser cavity between a rear mirror and output mirror having a gain medium and said EO pockels cell therein.

14. A method of cooling an optical device, comprising:
   providing said optical device including a crystal having optical end faces and non-optical faces spanning a length between said optical end faces, within a crystal capture housing (housing), said housing including:
      an outer housing body (body) having end openings having a crystal mount assembly (CMA) comprising a thermally conductive material having end openings connected to an internal opening sized to have said crystal mounted therein, wherein said CMA thermally contacts each of said non-optical faces of said crystal;
      wherein said CMA includes a plurality of embedded liquid coolant conduit channels (coolant channels) formed therethrough spanning said length, and
      wherein said CMA is sized to fit within said body and provide an air gap between said CMA and said body, and
   during operation of said optical device:
      transmitting light between said optical end faces, and during said transmitting flowing a fluid through said coolant channels.

15. The method of claim 14, further comprising flowing a gas through said air gap during said transmitting.

16. The method of claim 14, wherein said optical device comprises an EO device having first and second electrodes on first and second ones of said non-optical faces, and wherein during said operation of said optical device biasing said EO device using said electrodes.

17. The method of claim 14, wherein said housing further comprises a first manifold assembly including a first manifold fitting on one end of said body and a second manifold assembly including a second manifold fitting on another end of said body fluidically coupled to said coolant channels for allowing said flowing said fluid through said coolant channels.

18. The method of claim 14, wherein said CMA fully surrounds each of said non-optical faces of said crystal.

19. The method of claim 14, wherein said optical device comprises an electro optic (EO) pockels cell comprising first and second electrodes on first and second ones of said non-optical faces within a Q-switched laser system including a laser cavity between a rear mirror and output mirror having a gain medium and said EO pockels cell therein.

* * * * *